United States Patent [19]

Neumann

[11] 4,181,332
[45] Jan. 1, 1980

[54] FLEXIBLE PIPE CONNECTION

[75] Inventor: Joachim Neumann, Brunswick, Fed. Rep. of Germany

[73] Assignee: Volkswagenwerk Aktiengesellschaft, Wolfsburg, Fed. Rep. of Germany

[21] Appl. No.: 800,851

[22] Filed: May 26, 1977

[30] Foreign Application Priority Data

May 26, 1976 [DE] Fed. Rep. of Germany ....... 2623520
Mar. 10, 1977 [DE] Fed. Rep. of Germany ....... 2710357
Apr. 16, 1977 [DE] Fed. Rep. of Germany ....... 2716894

[51] Int. Cl.² .............................................. F16L 27/04
[52] U.S. Cl. ................................ 285/334.4; 285/420; 285/137 R; 285/179; 285/406
[58] Field of Search ..................... 285/106, 420, 334.4, 285/332, 332.1, 364, 137 R, 179, 279, 280, 282, 156; 181/36 B, 40, 46; 267/166, 173, 179, 180

[56] References Cited

U.S. PATENT DOCUMENTS

| 346,478 | 8/1886 | Holmes | 285/282 |
|---|---|---|---|
| 951,704 | 3/1910 | Schmidt | 285/156 X |
| 1,824,792 | 9/1931 | Reure | 285/282 |
| 2,126,505 | 8/1938 | Risser . | |
| 2,459,389 | 1/1949 | Neuman . | |
| 3,704,995 | 12/1972 | Hetherington | 285/332 |
| 3,792,878 | 2/1974 | Freeman | 285/137 R |
| 3,872,894 | 3/1975 | Streit | 285/137 R X |
| 4,002,358 | 1/1977 | Streit | 285/137 R |

FOREIGN PATENT DOCUMENTS

| 268353 | 10/1929 | Italy | 285/129 |
|---|---|---|---|
| 960436 | 3/1957 | Fed. Rep. of Germany . | |
| 1526557 | 4/1970 | Fed. Rep. of Germany . | |
| 2130789 | 10/1972 | France . | |
| 1418 | of 1858 | United Kingdom | 285/332 |
| 24307 | of 1894 | United Kingdom | 285/332.1 |
| 603933 | 6/1948 | United Kingdom . | |

OTHER PUBLICATIONS

Springs and Formed Wires, published by the Colorado Fuel & Iron Corp. (p. 6).

Primary Examiner—Andrew V. Kundrat
Attorney, Agent, or Firm—Brumbaugh, Graves, Donohue & Raymond

[57] ABSTRACT

A pipe connection, particularly useful for a motor vehicle exhaust line, is provided with a spherical sealing surface on one pipe which projects into an axial accommodating space on a mating pipe. The pipes are held together by spring clamps which have ends facing each other for engaging oppositely facing recesses on clamping structures associated with each pipe.

12 Claims, 6 Drawing Figures

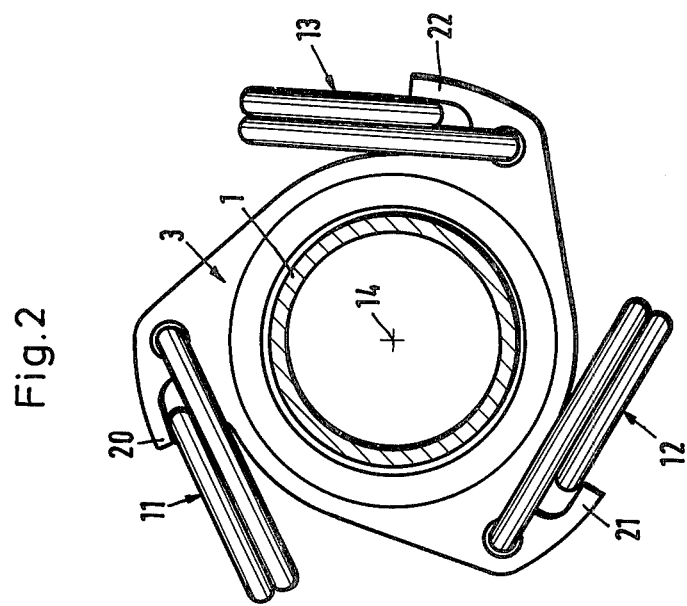
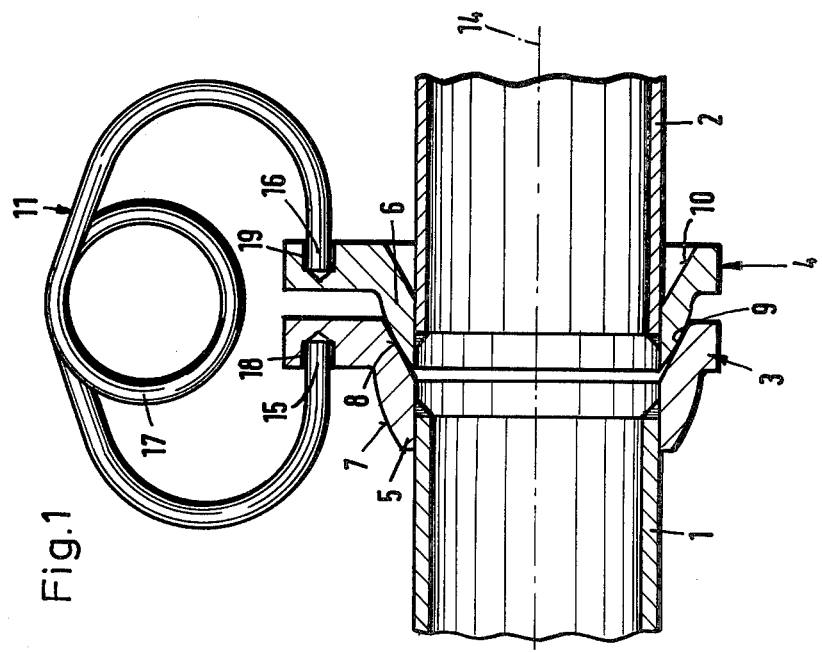

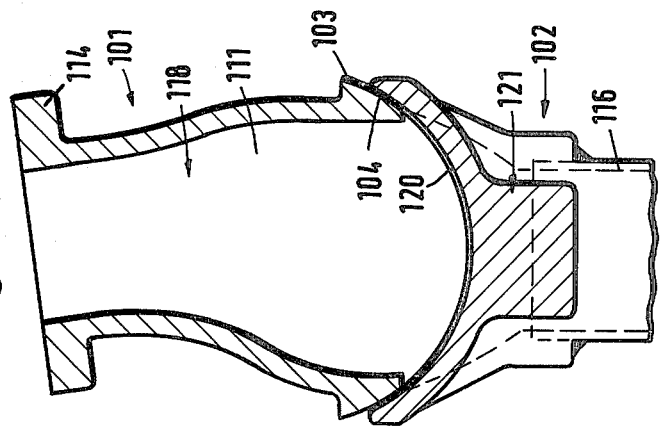
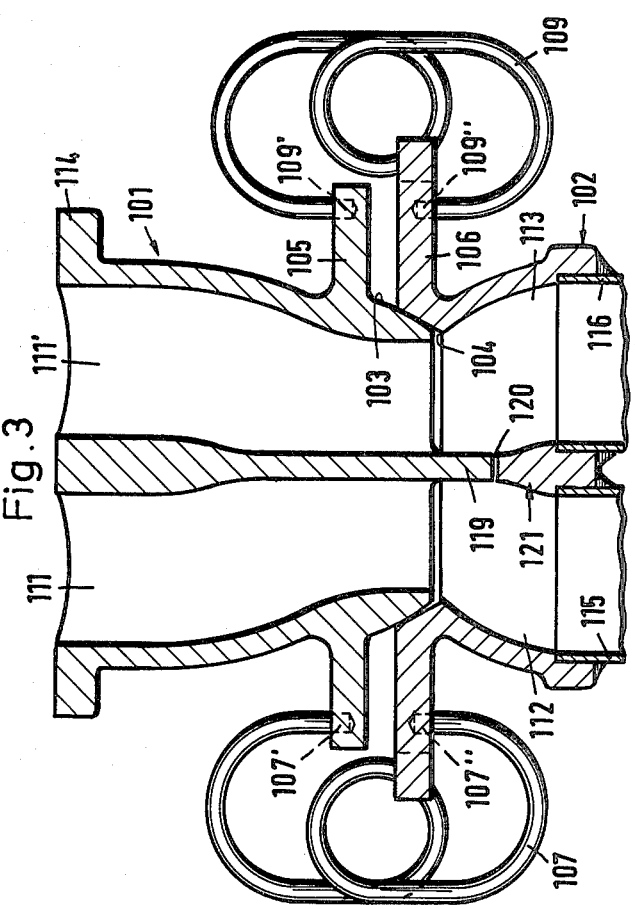
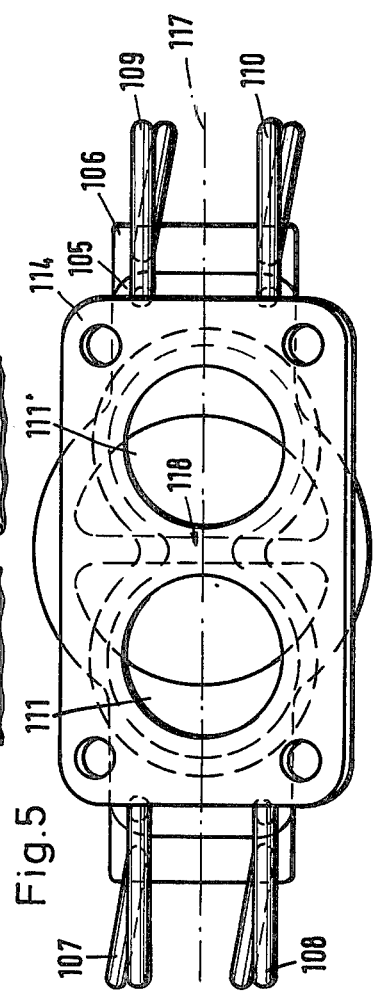

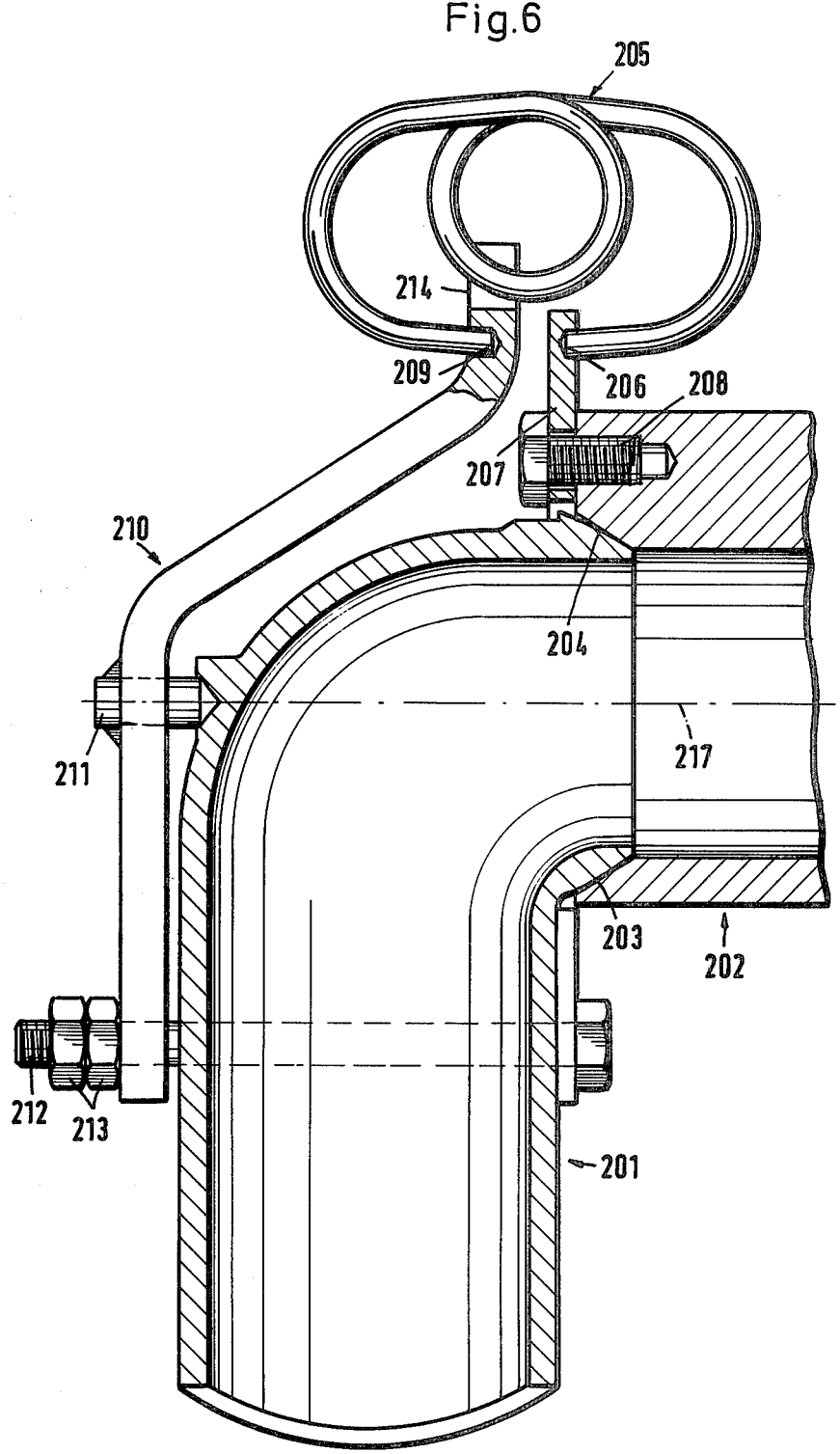

FLEXIBLE PIPE CONNECTION

BACKGROUND OF THE INVENTION

This invention relates to pipe connections, and particularly to flexible connections for use with rigid exhaust pipes in a motor vehicle.

Published German application No. 1,526,557 discloses a connection for use with a motor vehicle exhaust pipe, wherein an intermediate piece having spherical sealing surfaces is mounted between pipe ends to be connected. The intermediate piece is clamped into position by use of a bolt and springs interconnecting flanges surrounding each of the pipes. Graphite rings are provided between the intermediate piece and each pipe end for receiving the spherical sealing surface of the intermediate piece.

The prior art connection arrangement is effective in providing an exhaust line joint which permits angular movement between the rigid pipes, but prevents leakage of exhaust gasses at the joint.

Because of the need to provide an intermediate piece in addition to graphite rings, flanges and springs, the prior art connection is rather complex and expensive to build and assemble. In addition, the use of a helical spring necessitates a large diameter flange or flange extensions so that the spring can be maintained at an appropriate distance from the hot exhaust pipe. Further, the use of a helical spring provides a compression of the joint along the axis of the pipes, but does not provide a resistance to rotational motion of the pipes.

It is therefore an object of the present invention to provide a new and improved flexible pipe connection.

It is a further object of the invention to provide a connection which is compact and inexpensive to construct and install.

It is a still further object of the invention to provide a connection which provides resistance to angular rotation between connected pipes.

It is a still further object of the invention to provide a connection which may be used with multiple channel pipes.

SUMMARY OF THE INVENTION

In accordance with the present invention, there is provided an apparatus for flexibly connecting first and second pipes. The apparatus includes a spherical sealing surface projecting axially outward from an end of the first pipe. The second pipe has an axial accommodating space for receiving the spherical surface. Clamping structures are associated with each pipe and spring clamps are provided which have ends directed toward each other and are adapted for clamping engagement in oppositely facing recesses provided on the clamping structures. The clamps urge the spherical surface into the accommodating space.

The clamps are preferably C-shaped and are provided with at least one loop on the side opposite the ends directed toward each other. At least one of the clamping structures may be provided with hook-shaped recesses for locking the clamps in a selected pivoting position. The accommodating space may be provided with a conical sealing surface for engaging the spherical sealing surface.

The invention may be used to join pipes having multiple flow channels, in which case, the pipes are preferably joined along a line perpendicular to the plane in which swiveling is most likely to occur. The pipes may be provided with partitions separating the channels and having mating convex and concave edges to accommodate the swiveling. A multiple channel connection is preferably provided with rectangular flanges having edges extending beyond the pipe connection in a direction parallel to the swivel axis and engaged by the spring clamps on the extended edges.

When one of the pipes has a bend near the connection, a lever may be used as a clamping structure. The lever is secured to the other pipe at one end, engages the bent pipe in the center by a pivot pin and is clamped at the other end.

For a better understanding of the present invention together with other and further objects, reference is made to the following description, taken in conjunction with the accompanying drawings, and its scope will be pointed out in the appended claims.

BRIEF DESCRIPTION OF THE DRAWINGS

FIG. 1 is a longitudinal cross-section of a flexible pipe connection in accordance with the present invention.

FIG. 2 is an axial view of the FIG. 1 connection.

FIG. 3 is a horizontal, longitudinal cross-section of a multiple flow channel flexible connection in accordance with the present invention.

FIG. 4 is a vertical, longitudinal cross-sectional view of the FIG. 3 connection.

FIG. 5 is an end view of the FIG. 3 connection.

FIG. 6 is a cross-section of a flexible connection of a bent pipe in accordance with the invention.

DESCRIPTION OF THE INVENTION

The cross-sectional view of FIG. 1 shows the end regions of the joined pipes 1 and 2. Pipe 1 is provided with a flange 3 which mates with flange 4 connected to pipe 2. Both flanges have identical construction, but are mounted oppositely facing on their respective pipe ends. Flanges 3 and 4 may be fabricated by conventional techniques, such as casting, and attached to the pipe ends by welding. Flange 4 is provided with an axially projecting extension 6 which has a spherical sealing surface 8 extending toward the mating flange. Flange 3 is provided with an axial accommodating space having a surface 9 which is preferably conical. For economy of production, flange 3 also has a projecting extension 5 with a spherical surface 7 which is used only for welding flange 3 to pipe 1. Likewise, flange 4 has an accommodating space with a conical surface 10 which is unused. Flanges 3 and 4 act as clamping structures and are provided with blind holes or recesses 18 and 19 which are oppositely facing and adapted to engage the ends 15 and 16 of the spring clamp 11. In the cross-section of FIG. 1, spring clamp 11 is shown extending radially from the axis 14 of pipes 1 and 2. Radial extension causes spring loop 17 to be maintained at a substantial distance from pipes 1 and 2 which may reach a high temperature in the case of an exhaust line.

As may be seen from the axial view of FIG. 2, the flanges may be clamped by three identical C-shaped spring clamps 11, 12, and 13. The clamps are arranged symmetrically around the axis 14 of the pipes 1 and 2. In the FIG. 2 illustration, spring clamps 11, 12, and 13 are maintained in hook-shaped recesses 20, 21, and 22 which prevent pivoting of the clamps around the points where there engage flanges 3 and 4.

It may be seen from the drawing that clamps 11, 12, and 13 provide a resilient engagement of the sealing surfaces 8 and 9 on flanges 4 and 3. This permits a swiveling movement between rigid pipes 1 and 2. Allowance for such swiveling movement is particularly important in a motor vehicle exhaust line wherein the engine and chassis are interconnected by flexible mountings and the exhaust line is connected to both engine and chassis. In addition to providing resilient engagement, the C-shaped clamps provide a resistance to relative rotational movement between the pipes which is not provided by the connection in accordance with the prior art discussed above.

MULTIPLE FLOW CHANNEL EMBODIMENT

FIGS. 3 through 5 illustrate an embodiment of the invention useful for connecting multiple channel pipes. The cross-sectional view of FIG. 3 illustrates channels 111 and 111' of a first pipe 101 and channels 112, 113 of second pipe 102. The mating end of pipe 101 is provided with a spherical sealing surface 103 which is part of flange 105. Sealing surface 103 fits into accommodating space 104 on flange 106 of pipe 102. Springs 107, 108, 109, and 110 are engaged in oppositely facing recesses on flanges 105 and 106 by their free ends 107', 107'', 109', and 109'', etc., and serve to bring pipes 101 and 102 into sealing engagement. The adjoining flow channels 112, 113, 111, 111' of each of the pipes are preferably arranged along a line 117 corresponding to the axis along which swiveling motion is most likely to occur, in the case of a vehicle exhaust pipe axis 117 is most likely horizontal and transverse to the vehicle.

In order to provide isolation between the adjacent flow channels of pipes 101, 102, partitions 118 and 121 are provided in the vicinity of the pipe connection. Partition 118 has a projecting end portion 119 with a circular edge which mates with a concave edge 120 of partition 121 to provide sealing between the adjacent passages even during substantial swivel motion of the joint about axis 117 and a lesser amount of swiveling in an axis perpendicular to axis 117.

Flanges 105 and 106 have rectangular extended edges which project beyond pipes 101 and 102 in the directions of swivel axis 117. Clamps 107, 108, 109, and 110 engage the extended flange edges and thereby permit substantial swiveling motion of the joint about axis 117 and resistance to swiveling about an axis perpendicular to axis 117.

In the embodiment illustrated in FIGS. 3 through 5, pipe 101 is a rather short section of pipe provided with flange 114. Pipe 102 is a short section which is connected to a pair of individual pipes 115 and 116. Those familiar with the art will recognize that the length or configuration of the pipes extending in either direction from the connection are immaterial to the invention. By the use of the double flow channel configuration illustrated in FIGS. 3 through 5, it is possible to advantageously provide a swivel joint of an exhaust pipe prior to the point at which exhaust manifolds are joined and consequently in close proximity to the vehicle engine. Such a joint can be used to interconnect an exhaust manifold with an engine pipe.

It should also be recognized that in accordance with the invention, it is possible to connect pipes having more than two channels by arranging the channels in a line along the axis about which swiveling is to be expected. It is also possible to connect a single channel pipe with a multiple channel pipe.

FIG. 6 is a cross-sectional view of an embodiment of the invention useful for the connection of a pipe to an exhaust manifold. In such a connection, as well as in other structures, it is not possible to provide a symmetrical connection such as shown in FIGS. 1 and 2. In the FIG. 6 embodiment, a manifold pipe 201 is connected to a second pipe 202. Pipe 201 has a right angle bend immediately adjacent the connection to pipe 202. It should be noted that pipe 201 does not extend in the plane of the drawing, but as noted by the eliptical shape of the opening at the lower end, is inclined with respect to the plane of the drawing so that bolt 212 passes behind the pipe. In order to accommodate a connection in the presence of the bend, the spherical sealing surface 203 is urged against the conical counter sealing surface 204 along the axis 217 of pipe 202 by lever 210. Lever 210 engages pipe 201 by a pivot pin 211. Bolt 212 and nuts 213 secure one end of lever 210 to flange 207 which is secured to pipe 202 by bolt 208. Nuts 213 may be adjusted to vary the position of lever 210. Clamp ends 206 and 209 engage recesses in flange 207 and lever 210 respectively to bring sealing surface 203 and 204 together. A hook-like extension 214 of lever 210 maintains the pivot position of C-clamp 205 away from the hot exhaust pipes. Pivot pin 211 at the point lever 210 applies pressure to pipe 201 permits pivoting of pipes 201 and 202 with respect to each other at the spherical sealing surface 203. The bores in lever 210 and flange 207 for bolt 212 have sufficient clearance to permit pivoting between pipes 201 and 202.

The flexible connection of the present invention provides an easily assembled and disassembled joint for use in an exhaust line, which is resistant to corosion and heat damage normally encountered in exhaust line joints. Multiple channel pipes can be easily joined together and the joint permits swiveling of the pipes with respect to each other but resists relative axial rotation. Since no elastic seals are required in the joint, it is long-lasting and not susceptible to malfunction or breakdown.

While there have been described what are believed to be the preferred embodiments of the invention, those skilled in the art will recognize that other and further modifications may be made thereto without departing from the spirit of the invention and it is intended to claim all such embodiments as fall within the true scope of the invention.

I claim:

1. Apparatus for providing a releasable, flexible sealed connection between first and second pipes, said apparatus comprising: a spherical sealing surface projecting axially outwardly from an end of said first pipe; an axial accommodating space on an end of said second pipe for receiving said spherical surface, said axial accommodating space having a conical sealing surface for engaging said spherical sealing surface; first and second clamping structures rigidly attached to said first and second pipes, respectively, and at least one spring clamp having opposite ends directed toward each other and bottomed in oppositely facing recesses on said first and second clamping structures to urge said spherical surface into said accommodating space, said spherical surface and said accommodating space cooperating to allow said pipes to swivel with respect to each other.

2. Apparatus as specified in claim 1 wherein said spring clamp comprises a C-shaped clamp having at least one loop on the side opposite said ends.

3. Apparatus as specified in claim 1 wherein at least one of said clamping structures is provided with hook-shaped recesses for locking said clamp in a selected pivoting position.

4. Apparatus as specified in claim 1 wherein said first clamping structure and said spherical sealing surface are formed on a first flange secured to said first pipe and wherein said second clamping structure and said accommodating space are formed on a second flange secured to said second pipe, and wherein said first and second flange structures have substantially the same shape.

5. Apparatus as specified in claim 1 wherein said first and second pipes are each multiple channel pipes.

6. Apparatus as specified in claim 5 wherein the longitudinal axes of said channels, at their ends, are arranged in a single plane.

7. Apparatus as specified in claim 5 wherein each of said pipes is provided with a partition separating said channels, wherein the partition associated with said first pipe has a convex edge and the partition associated with said second pipe has a corresponding concave edge.

8. Apparatus as specified in claim 6 wherein said clamping structures comprise flange extensions projecting outwardly in the direction of said plane and engaged by said clamps in the vicinity of their extended edge, whereby said clamps apply a lesser restoring moment against swivelling of said pipes about an axis parallel to said plane than about an axis perpendicular thereto.

9. Apparatus as specified in claim 1 wherein one of said pipes has a bend in the vicinity of the pipe connection and wherein the clamping structure associated with the bent pipe comprises a lever acting by its central portion on the bent pipe in the direction of the axis of the other pipe, said lever being fixedly secured at one end and maintained by said spring clamp at the opposite end.

10. Apparatus as specified in claim 9 wherein the secured end of said lever is bolted to said other pipe.

11. Apparatus as specified in claim 10 wherein said clamping structure associated with said other pipe comprise a flange, having said recesses for said spring clamp and maintaining the secured end of said lever.

12. Apparatus as specified in claim 9 wherein the central portion of said lever acts on said bent pipe by means of a pivot pin.

* * * * *